US009248597B2

(12) United States Patent
Rumore

(10) Patent No.: US 9,248,597 B2
(45) Date of Patent: Feb. 2, 2016

(54) BUBBLER BASE

(75) Inventor: Kenneth T. Rumore, Wauconda, IL (US)

(73) Assignee: Progressive Components International Corporation, Wauconda, IL (US)

( * ) Notice: Subject to any disclaimer, the term of this patent is extended or adjusted under 35 U.S.C. 154(b) by 138 days.

(21) Appl. No.: 13/437,653

(22) Filed: Apr. 2, 2012

(65) Prior Publication Data
US 2013/0256952 A1 Oct. 3, 2013

(51) Int. Cl.
*B29C 45/73* (2006.01)
*B29C 45/26* (2006.01)
*B29C 33/02* (2006.01)

(52) U.S. Cl.
CPC ............ *B29C 45/73* (2013.01); *B29C 45/2606* (2013.01); *B29C 45/7312* (2013.01); *B29C 33/02* (2013.01)

(58) Field of Classification Search
CPC ...... B29C 45/73; B29C 45/7312; B29C 33/02
USPC ............. 425/547, 552, 548, 549, 190, 192 R, 425/575; 264/328.16
See application file for complete search history.

(56) References Cited

U.S. PATENT DOCUMENTS

| 3,498,778 | A | * | 3/1970 | Hynd | ............................... | 65/178 |
| 4,600,425 | A | | 7/1986 | Krumwiede et al. | | |
| 4,655,280 | A | * | 4/1987 | Takahashi | ........................ | 165/47 |
| 4,729,732 | A | * | 3/1988 | Schad et al. | ................... | 425/526 |
| 5,837,299 | A | * | 11/1998 | Bright et al. | ................... | 425/526 |
| 6,139,789 | A | * | 10/2000 | Neter et al. | .................... | 264/535 |
| 6,143,225 | A | * | 11/2000 | Domodossola et al. | ....... | 264/237 |
| 6,176,700 | B1 | * | 1/2001 | Gellert | ........................... | 425/547 |
| 6,276,922 | B1 | | 8/2001 | Huston et al. | | |
| 6,425,752 | B1 | * | 7/2002 | Check | ........................... | 425/526 |
| 6,817,855 | B2 | * | 11/2004 | Unterlander et al. | ......... | 425/150 |
| 6,916,168 | B2 | * | 7/2005 | Romanski et al. | ............ | 425/547 |
| 6,951,452 | B2 | * | 10/2005 | Unterlander et al. | ......... | 425/145 |
| 7,252,497 | B2 | * | 8/2007 | Neter et al. | .................... | 425/547 |
| 7,964,129 | B1 | * | 6/2011 | James | ........................... | 264/237 |
| 8,033,810 | B2 | | 10/2011 | Helenius et al. | | |

(Continued)

FOREIGN PATENT DOCUMENTS

JP 2004-298921 10/2004
WO WO99/64218 * 12/1999 .............. B29C 33/04

OTHER PUBLICATIONS

WEMA Beheizungstechnik GmbH, "Elements for mould cooling catalog", pp. 7.1.3. 7.1.7, and 7.1.12.

(Continued)

*Primary Examiner* — Joseph S Del Sole
*Assistant Examiner* — Nahida Sultana
(74) *Attorney, Agent, or Firm* — Pauley Erickson & Kottis

(57) ABSTRACT

A bubbler base or base body for accepting a bubbler tube that has an externally threaded section at one end of the bubbler tube. The bubbler base of this invention can be used to quickly attach the bubbler base already connected to a bubbler tube, without the need to form an internally threaded bore within a bottom clamp plate which is also referred to as a cooling plate and is conventionally known in the molding tool industry. A conventional bubbler tube can be attached to the bubbler base rather than to the bottom clamp plate or the cooling plate. The bubbler base can have an overall spool shape. An O-ring can be used to seal the bubbler base with respect to the bottom clamp plate or the cooling plate.

17 Claims, 3 Drawing Sheets

(56) References Cited

U.S. PATENT DOCUMENTS

| | | | | |
|---|---|---|---|---|
| 8,585,392 B2* | 11/2013 | Barnes | | 425/407 |
| 2002/0003199 A1 | 1/2002 | Check et al. | | |
| 2004/0056385 A1* | 3/2004 | Neter et al. | | 264/328.14 |
| 2004/0058030 A1* | 3/2004 | Romanski et al. | | 425/547 |
| 2004/0247734 A1* | 12/2004 | Unterlander et al. | | 425/528 |
| 2006/0051415 A1* | 3/2006 | Chow et al. | | 424/464 |
| 2007/0065536 A1* | 3/2007 | Chen | | 425/547 |
| 2007/0264385 A1* | 11/2007 | McCready et al. | | 425/547 |
| 2010/0040723 A1* | 2/2010 | Baumann et al. | | 425/547 |
| 2012/0231109 A1* | 9/2012 | Lee | | 425/547 |
| 2014/0374956 A1* | 12/2014 | Schad et al. | | 264/297.2 |

OTHER PUBLICATIONS www.ermannobalzi.com/en/cooling/bubbles.html, Bubbles in series, Apr. 2003 (1 page).
www.ermannobalzi.com/en/cooling/bubbles/parallel.html, Bubbles in parallel, Apr. 2009 (1 page).
www.ermannobalzi.com/en/cooling/plastic-bubbles.html, Plastic Bubbles, Apr. 2009 (1 page).
www.ermannobalzi.com/en/catalog.html, Ermanno Balzi General Catalogue, pp. 1.02, 1.04, 1.08-1.11, 1.27-1.29, Apr. 2009.
https://na.dmecompany.com/Catalog/Catalog.aspx, DME Catalog, DME Bubbler Tubes, Apr. 1981 (1 page).

* cited by examiner

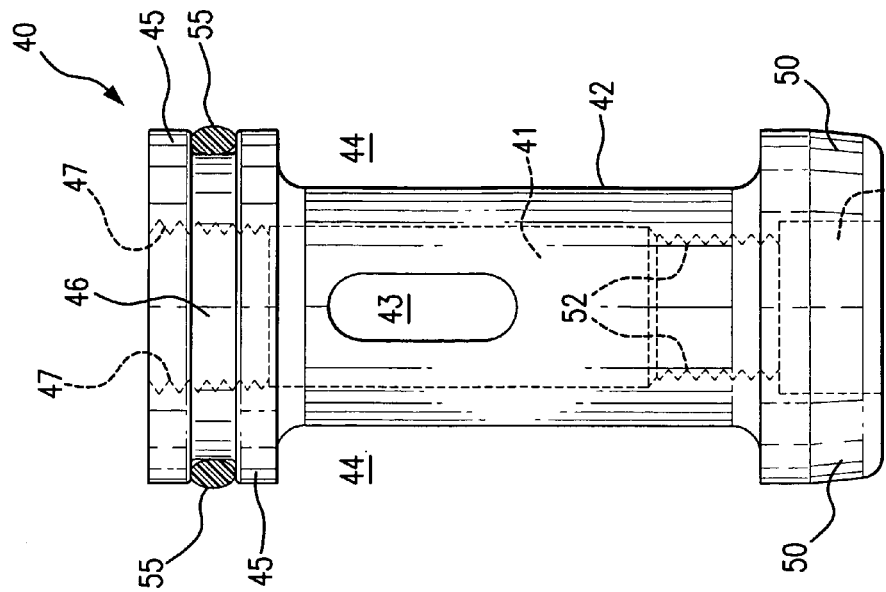
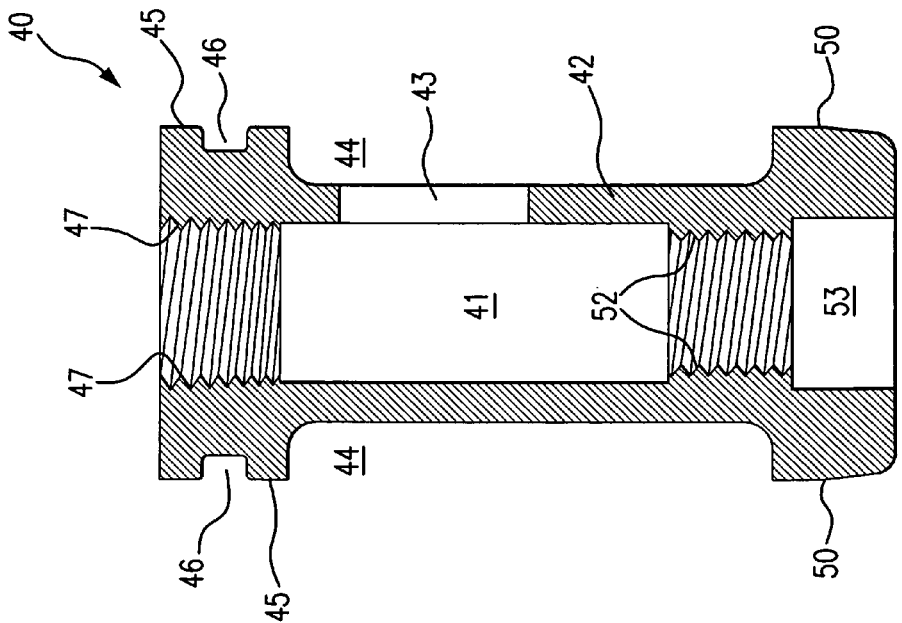

BUBBLER BASE

BACKGROUND OF THE INVENTION

1. Field of the Invention

This invention relates to a base structure, such as a bubbler base, used to retain or fix the position of bubbler tubes, also known as cascade tubes, into or with respect to a bottom clamp plate or other mold baseplate, particularly of an injection molding tool.

2. Discussion of Related Art

Bubbler tubes or cascade tubes having a tubular body with an externally threaded end portion are known. Many conventional bubbler tubes are screwed directly into an internally threaded bore of a bottom clamp plate or cooling plate of an injection molding tool. Other conventional bubbler tubes are installed with a slip fit directly into a non-threaded internal bore of the bottom clamp plate or cooling plate.

Many injection molding tool applications require an array of bubbler tubes, sometimes as many as tens or hundreds of bubbler tubes. With many bubbler tubes connected directly to the bottom clamp plate or cooling plate, it is very time-consuming, labor-intensive and costly. It is also often dangerous to install or replace an array of bubbler tubes because the bubbler tubes often have sharp ends and can project from the plate like a bed of nails.

One particular conventional design requires installation of each bubbler tube from a bottom side of the bottom clamp plate or cooling plate. Custom installation and operation tooling are required to install, mount and replace each bubbler tube. Because each bubbler tube of this type becomes an integral part with the plate, it is not possible to replace the bubbler tube in some instances.

There is an apparent need for an apparatus that can be used to quickly and safely install and/or replace bubbler tubes, particularly conventional bubbler tubes, within or with respect to the bottom clamp plate or cooling plate.

SUMMARY OF THE INVENTION

According to this invention, each bubbler tube is connected or fixed with respect to a base, such as a body structure, that can be positioned within a bore, such as a simple blind bore of a bottom clamp plate or cooling plate. No special tooling for tapping threads within the blind bore are required to provide or machine each bore within the bottom clamp plate or cooling plate of an injection molding tool according to this invention. Each base or body structure also has a seal, such as an O-ring seal, to prevent or minimize leakage of coolant from the molding tool.

The bubbler base of this invention can use more than one size of tube in each size of base and fit within the specified bore or hole within the bottom clamp plate or cooling plate. Also, differently sized tubes can be used with the same base or body structure of this invention so that the same bore or hole within the plate can be used. The bubbler base of this invention can be used to remove a bubbler tube without damaging and sometimes even without touching the bubbler tube.

It is possible to reduce machine downtime, particularly of an injection molding tool, with the bubbler base of this invention. For example, leakage can be reduced with the bubbler base of this invention and thus increase the time interval between machine downtimes. During any machine downtime, the bubbler base of this invention reduces the maintenance turnaround time because each bubbler tube does not require unscrewing of a threaded connection and/or removal of a slip fit arrangement. The bubbler base of this invention can be removed with the bubbler tube attached to the bubbler base and then replaced without the need to unscrew and then screw a conventional threaded connection or carefully align bubbler tubes that are slip fit into the bottom clamp plate or cooling plate.

The bubbler base of this invention can be removed by engaging a removal tool with extraction threads within the bubbler base, applying a force directly to the bubbler base with the removal tool and thus avoiding the need to touch or otherwise operate or work the bubbler tube. The bubbler base of this invention can use an O-ring to seal coolant flow rather than a screwed connection seal as used with conventional connections of bubbler tubes.

In some embodiments according to this invention, the bubbler base as an overall spool type configuration with a throat section positioned between opposing end sections. The throat section can have one or more voids, such as bores, forming fluidic communication between a passageway of the bubbler base, a passageway of the bubbler tube and an outlet or discharge, such as for cooling water or another suitable coolant.

There is an apparent need for a method and apparatus for connecting or fixing the position of a conventional bubbler tube to or with respect to the bottom clamp plate or cooling plate of an injection molding tool, particularly without a screwed connection and/or a slip fit connection between the bubbler tube and the bottom clamp plate or cooling plate.

BRIEF DESCRIPTION OF THE DRAWINGS

This invention is explained in greater detail below in view of exemplary embodiments shown in the drawings, wherein:

FIG. 2 is a cross-sectional view of a bubbler base, according to one embodiment of this invention;

FIG. 3 is a front view of a bubbler base, with an O-ring shown in cross section, according to the embodiment of this invention shown in FIG. 2.

DESCRIPTION OF PREFERRED EMBODIMENTS

Figure 1:
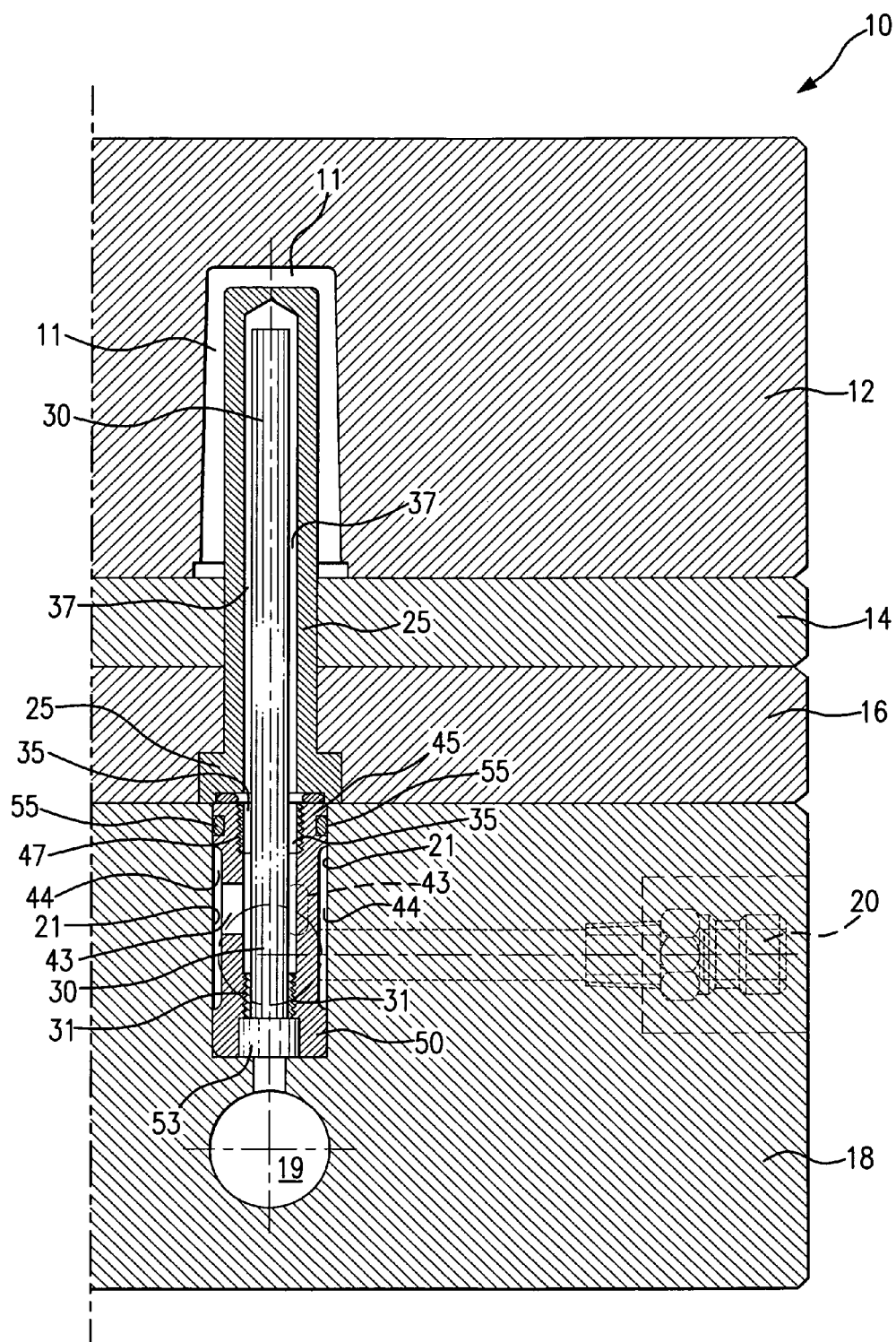
FIG. 1 is a partial cross-sectional view of a molding tool having a bubbler base, according to one embodiment of this invention.

FIG. 1 shows a partial cross-sectional view of molding tool 10, in a mold position for forming molded part 11, according to one embodiment of this invention. Cavity 12, stripper plate 14, core pin retainer plate 16 and/or bottom clamp plate 18 are movably mounted with respect to each other. As known in connection with conventional molding methods, cavity 12, stripper plate 14, core pin retainer plate 16 and/or bottom clamp plate 18 move with respect to each other to form part 11 and then strip, discharge and/or eject part 11 from its formed position in cavity 12 which is shown in FIG. 1.

In many conventional molding methods, a coolant such as water or another suitable cooling fluid flows into coolant inlet 19 of clamp plate 18, then in an upward direction, relative to the orientation of molding tool 10 as shown in FIG. 1, through an internal passageway of tube 30, then out of the upper portion of tube 30, then downward with respect to core pin 25 along void 37 formed between an external surface of tube 30 and core pin 25, then further downward through void 35 formed between the external surface of tube 30 and base 40, through passageways of base 40, and then eventually through and outward from coolant outlet 20 of clamp plate 18. In some embodiments of this invention, all of the flow channels, voids, spaces and/or passageways that accommodate coolant flow are in fluidic communication with each other.

In some embodiments of this invention, core pin 25 has a dovetailed configuration, for example as shown and described in U.S. Pat. No. 8,033,810, the entire disclosure of which is incorporated into this specification by reference to U.S. Pat. No. 8,033,810. In other embodiments of this invention, core pin 25 can have any other suitable configuration, shape and/or dimension.

Tube 30 with tube threads 31 at one end portion but no tube head 32, such as shown in FIG. 1, is known and used in conventional molding methods. However, when used in a conventional molding method, tube 30 is connected directly to clamp plate 18 and not directly to a different element, such as base 40 of this invention. As one example, in some conventional molding methods, tube threads 31 of tube 30 are threadedly engaged directly within a corresponding internally threaded bore within clamp plate 18, which is not shown in FIG. 1. The conventional screwed connection requires significant labor to install, replace and/or maintain, and also over time can accumulate mineral deposits, for example, between the threads and undesirably freeze-up or tightly lock with respect to each other. As another example, in some conventional molding methods, tube 30 is slip fit within a corresponding non-threaded bore within clamp plate 18 and thus forms a relatively loose frictional fit between an end portion of tube 30 and clamp plate 18, also which is not shown in FIG. 1. The conventional slip fit arrangement is prone to significant leaks of the coolant and also causes mineral deposits, for example, that are difficult and costly to remove.

Tube 30 according to this invention can have a relatively cylindrical outer surface, such as shown in FIG. 1. In other embodiments according to this invention, tube 30 can have a stepped outer diameter configuration that forms shoulders or can have any other suitable shape and/or size, depending upon the intended use for tube 30.

FIG. 1 shows base 40, which can be a bubbler base or any other suitable base structure or device, attached, connected, mounted and/or otherwise secured, directly and/or indirectly to clamp plate 18. As shown in FIG. 1 and in other embodiments of this invention, tube 30 is attached, connected, mounted and/or otherwise secured with respect to base 40. As shown in FIG. 1, for example, tube 30 is not directly connected to clamp plate 18.

Figure 4:
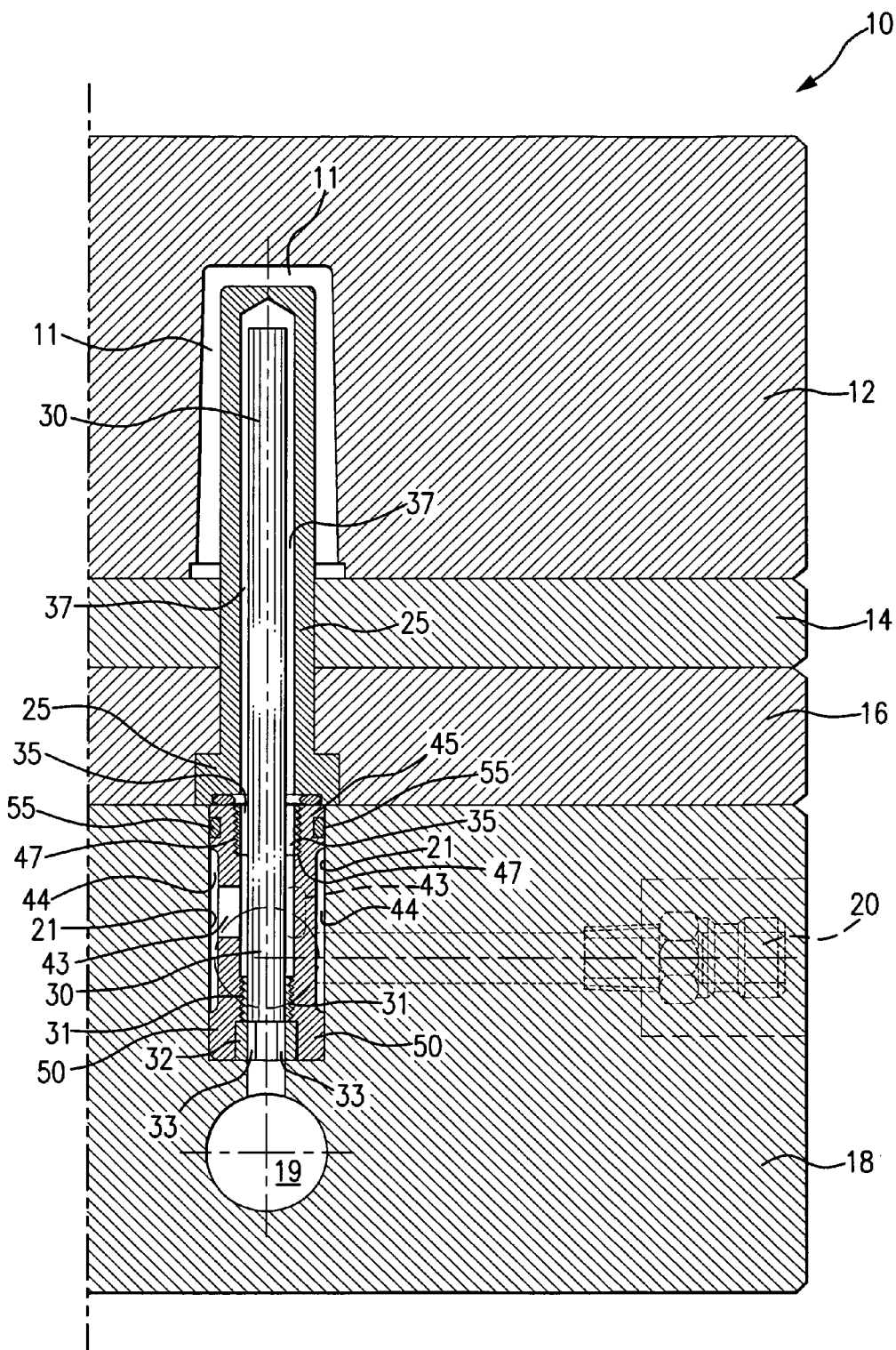
FIG. 4 is a partial cross-sectional of a molding tool having a bubbler base, according to another embodiment of this invention.

In some embodiments of this invention, tube threads 31 at an end portion of tube 30 threadedly engage within internal threads 52 of mounting end 50 of base 40, such as shown in FIGS. 2 and 3, and form a sealed connection between tube 30 and base 40. The sealed connection can be used to maintain a hermetic seal and/or a fluidic seal between the passageway of tube 30 and a space or a volume surrounding an external surface of tube 30, for example void 37 as shown in FIGS. 1 and 4 extending between an external surface of tube 30 and core pin 25. Tube threads 31 can be any suitable size, such as a standard size and/or a metric size. In some embodiments of this invention, the size and/or shape of tube threads 31 and/or internal threads 52 of base 40 correspond to or cooperate with any specified or suitable industry standard size and/or shape. Thus, in some embodiments of this invention, a conventional tube 30 can be used with base 40 of this invention. In other embodiments of this invention, tube threads 31 and/or internal threads 52 can have any custom or other suitable size and/or shape.

FIG. 1 shows tube 30 stopping at the end of tube threads 31. However, in other embodiments of this invention, such as shown in FIG. 4, tube 30 further comprises tube head 32 positioned or mounted within bore 53 of end 50 of base 40, for example as shown in FIGS. 1-3. In some embodiments of this invention, tube head 32 has internal flats 33, such as shown in FIG. 4, and/or an opening with another suitable non-circular cross section that can accommodate a hex wrench or another suitable tool for applying torque or another force used to rotate or otherwise move tube 30 with respect to base 40, for example to tighten or loosen tube 30 with respect to base 40. In a situation where minerals and/or other debris accumulate between tube threads 31 and internal threads 52, the hex wrench or other suitable tool can be used to apply a force necessary to remove tube 30, particularly without damaging tube threads 31 and/or internal threads 52.

In some embodiments according to this invention, base 40 comprises extraction threads 47, as shown in FIGS. 2 and 3, that can be used to remove base 40 from a mounted position with respect to clamp plate 18. For example, a pipe or other suitable tubular member with an externally threaded end portion can be positioned over tube 30 and moved toward base 40 until the external threads of the pipe or other tubular member engage with threads 47 of base 40. The pipe or other tubular member can then be rotated, pushed and/or pulled, even by applying a wrench force to the pipe or other tubular member, to remove base 40 from its mount position with respect to clamp plate 18. The pipe or other tubular member can be used to indirectly apply significant forces without damaging tube 30.

In some embodiments of this invention, regardless of the configuration of tube 30, such as with or without tube head 32, base 40 can have the same configuration and still accommodate either configuration of tube 30. In an assembled position, for example as shown in FIGS. 1 and 4, tube 30 passes through an opening of base 40 that forms extraction threads 47, and void 35 formed between an external surface of tube 30 and base 40 is in fluidic communication with void 37 and bore 43 of base 40 and thus allows the coolant to flow in a downstream direction towards and then through outlet 20. In the embodiment shown in FIG. 1, tube 30 can be assembled by inserting tube 30 into the upper end of base 40, with respect to the orientation of molding tool 10 as shown in FIG. 1, such as sealing end 45 of base 40, and then rotating tube 30 about its longitudinal axis to tighten tube 30 with respect to base 40. In the embodiment shown in FIG. 4, tube 30 can be assembled by inserting tube 30 into the lower end of base 40, with respect to the orientation of molding tool 10 as shown in FIG. 4, such as mounting end 50 of base 40, and then rotating tube 30 and/or tube head 32 about its longitudinal axis to tighten or loosen tube 30 with respect to base 40. The embodiment shown in FIG. 4, such as flats 33 and/or the non-circular opening of tube head 32, can be used to apply a significant torque or other applied force that is necessary to remove tube 30. However, in any embodiment of this invention, any tube 30 and/or any external surface of tube 30 can have flats, a knurled surface and/or any other suitable structure for applying a torque or other rotational force.

In some embodiments of this invention, base 40 can be used to install and/or remove tube 30 with respect to clamp plate 18. In conventional molding methods, tube 30 is connected directly to clamp plate 18, and in those instances in which tube 30 has tube threads 31, special tooling is required to bore and then tap threads in the bore of clamp plate 18. This arrangement is dangerous, cumbersome and difficult to replace tubes 30, particularly an array of tens or even hundreds of tubes 30, and particularly when minerals or other debris becomes lodged between tube threads 31 and the corresponding internal threads within clamp plate 18, which can cause a welded-together effect.

Base 40 according to this invention can have several different sizes and/or shapes. It is possible to use a differently sized tube 30 with the same sized base 40, which provides a fast, simple and inexpensive way to change tube 30 sizes without changing clamp plate 18, particularly when clamp plate 18 has several internally threaded bores each accommodating one tube 30. In some embodiments of this invention, a differently sized tube 30 is used with the same size of threads 31 on tube 30.

In some embodiments of this invention, base 40 is mounted within a bore, such as bore 21 shown in FIGS. 1 and 4. Bore 21 can be easily drilled or otherwise formed within clamp plate 18, as compared to an internally threaded bore within clamp plate 18. Some embodiments of base 40 comprise end 45 having peripheral groove 46, such as a circumferential groove, that accommodates O-ring 55, for example as shown in FIGS. 1, 3 and 4. O-ring 55 can be used to seal body 40 with respect to clamp plate 18 and can provide added structure or structural support. O-ring 55 can be used to significantly reduce leakage and thus reduced machine downtime associated with molding tool 10.

O-ring 55 can have any suitable design, size and/or shape and can be made of any suitable material, including but not limited to a suitable flexible material known for O-rings. O-ring 55 can be positioned around or about end 45 and/or groove 46, such as shown in FIGS. 1, 3 and 4. In other embodiments of this invention, O-ring 55 can be integrated with end 45. O-ring 55 can have a generally circular cross section or can have any other suitable cross section.

FIGS. 2 and 3 show one embodiment of base 40 comprising a body forming throat section 42 and opposing ends 45 and 50. End 50 can be used to connect, mount, secure and/or otherwise fix the position of base 40 with respect to clamp plate 18. As shown in FIGS. 1-3, end 50 of base 40 is used to structurally hold base 40 with respect to mounting plate 18. In some embodiments of this invention, because base 40 has no threaded connection with respect to clamp plate 18, base 40 can be quickly and easily removed from clamp plate 18, even if there is a significant build-up of or a heavy deposit of minerals and/or other debris between base 40 and clamp plate 18.

As shown in FIGS. 2 and 3, end 50 can have at least a portion of the sidewall forming end 50 taper or be chamfered in a direction away from throat section 42, for example, to simplify inserting or installing base 40 within bore 21 of clamp plate 18. In some embodiments of this invention, the dimensions of end 50, such as an outer diameter, outer periphery and/or outer circumference of end 50, is designed or selected to form a relatively tight fit, for example to form a sturdy frictional fit between base 40 and clamp plate 18. In some embodiments of this invention, the size and/or the shape of end 45 and/or O-ring 55 is selected and/or designed to provide further structural support or integrity and thus secure and/or fix the position of tube 30 with respect to clamp plate 18. Tolerances can be designed and/or selected, for example at the fit between end 50 of base 40 and the surface of clamp plate 18 that forms bore 21, so that a desired structural rigidity of base 40 mounted within bore 21 provides a secured connection and/or fixation of tube 30 with respect to clamp plate 18.

As shown in FIGS. 1-3, void 44 forms a volume or space between base 40 and clamp plate 18 that accommodates fluidic communication with passageway 41, bore 43 and outlet 20. Any other suitably shaped and/or sized void 44 can be used to accomplish the same result of providing fluidic communication between coolant flowing through tube 30 and outlet 20.

As shown in FIGS. 1 and 4, outlet 20 is integrated with and/or fixed with respect to clamp plate 18. However, in other embodiments according to this invention, outlet 20 can have any other suitable shape and/or connection arrangement that provides fluidic communication between outlet 20, bore 43, passageway 41 and/or a channel formed by tube 30.

Base 40 according to this invention can also be used in connection with and/or as a part of mold cooling cascades, baffle positioning such as with extraction threads 47, plugging water lines such as cooling water lines, repairing water lines such as cooling water lines and/or redirecting the flow of a coolant system such as a water system to change the level of a water system, to add a flow valve to a water system and/or to jump or provide a jumper for a cooling system within molding tool 10 of this invention or another suitable molding tool.

As shown in one embodiment of FIGS. 2 and 3, base 40 forms void 44 between ends 45 and 50 and thus forms an overall spool shape of base 40. However, in other embodiments of this invention, base 40 can have any other suitable shape, preferably but not necessarily that provides a seal at end 45, that provides structural integrity for the fixing the position of tube 30 with respect to clamp plate 18 and/or that allows coolant to flow from passageway 41 of base 40 through one or more bores 43 and then through outlet 20. Bore 43 can have a shape as shown in FIGS. 1-4 or can have any other suitable shape that provides a desired flow of coolant, for example.

According to some embodiments of this invention, a method for supplying a coolant to molding tool 10 which has clamp plate 18 movable with respect to cavity 12 has the coolant flowing through elements as mentioned and described in this specification. In some embodiments of this invention, the coolant flows through tube 30 which is fixed with respect to clamp plate 18. Some method steps of this invention include providing bore 21 within clamp plate 18 and replaceably mounting base 40 within bore 21. In some embodiments of this invention, tube 30 is secured directly to and/or indirectly to base 40. Fluidic communication is formed at least between inlet 20, the passageway of tube 30, void 37, void 35, bore 43 and outlet 20. In some embodiments of this invention, O-ring 55 is positioned between base 40 and clamp plate 18, and O-ring 55 seals base 40 with respect to clamp plate 18.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. In a molding tool having a clamp plate moveable with respect to a cavity, and a coolant flowing through a tube fixed with respect to the clamp plate, the improvement comprising: the clamp plate having a bore, a base replaceably mounted within the bore, the base having no threaded connection with respect to the clamp plate, the tube secured to said base, said base comprising a throat section positioned between a mounting end and a sealing end of said base, said base having a base bore, said base forming a first void with respect to the clamp plate, said base forming a second void with respect to an external surface of the tube, and said base bore, said first void and said second void in fluidic communication with each other, a passageway extending through said throat section, said mounting end and said sealing end, and said base forming fluidic communication between a coolant inlet and a passageway of said base.

2. In the molding tool according to claim 1, further comprising an O-ring mounted between said base and the clamp plate, and said O-ring sealing said base with respect to the clamp plate.

3. In the molding tool according to claim 1, further comprising a seal mounted between said base and the clamp plate, and said seal sealing said base with respect to the clamp plate.

4. In a molding tool having a clamp plate moveable with respect to a cavity, and a coolant flowing through a tube fixed with respect to the clamp plate, the improvement comprising: the clamp plate having a bore, a base replaceably mounted within the bore, the base having no threaded connection with respect to the clamp plate, the tube secured to said base, said base comprising a throat section positioned between a mounting end and a sealing end of said base, a passageway extending through said throat section, said mounting end and said sealing end, and said base forming fluidic communication between a coolant inlet and a passageway of said base, wherein said base has first threads engageable with second threads of the tube.

5. In the molding tool according to claim 4, wherein said first threads are internal threads of said base and said second threads are external threads of the tube.

6. In a molding tool having a clamp plate moveable with respect to a cavity, and a coolant flowing through a tube fixed with respect to the clamp plate, the improvement comprising: the clamp plate having a bore, a base replaceably mounted within the bore, the base having no threaded connection with respect to the clamp plate, the tube secured to said base, said base forming fluidic communication between a coolant inlet and a passageway of said base, said base having first threads engageable with second threads of the tube, and the tube having a head mounted within a mounting bore of a mounting end of said base.

7. In the molding tool according to claim 6, wherein said head forms a non-circular bore that accommodates a tool for rotating said head with respect to said base.

8. In the molding tool according to claim 1, wherein said first void is in fluidic communication with a third void formed between said external surface of the tube and a core pin mounted with respect to a retainer plate, and said second void is in fluidic communication with a coolant outlet.

9. In a molding tool having a clamp plate moveable with respect to a cavity, and a coolant flowing through a tube fixed with respect to the clamp plate, the improvement comprising: the clamp plate having a bore, a base replaceably mounted within the bore, the tube secured to said base, said base forming fluidic communication between a coolant inlet and a passageway of said base, said base having extraction threads engageable with threads of a removal tool, a sealing end of said base forming said extraction threads about an opening of said sealing end of said base, and the tube positioned within said opening of said sealing end and forming a void between said base and an external surface of the tube.

10. In the molding tool according to claim 1, wherein said passageway forms fluidic communication with said coolant inlet and a void formed between an external surface of said tube and a core pin mounted with respect to a retainer plate.

11. In the molding tool according to claim 1, wherein said base has extraction threads engageable with threads of a removal tool.

12. In the molding tool according to claim 11, wherein a sealing end of said base forms said extraction threads about an opening of said sealing end of said base.

13. In the molding tool according to claim 9, wherein said base comprises a throat section positioned between a mounting end and a sealing end of said base, and a passageway extends through said throat section, said mounting end and said sealing end.

14. In a molding tool having a clamp plate moveable with respect to a cavity, and a coolant flowing through a tube secured with respect to the clamp plate, the improvement comprising: the clamp plate having a bore, a spool-shaped base having a sealing end and a mounting end mounted within the bore, the tube secured to said base, said spool-shaped base having a throat section positioned between a mounting end and a sealing end of said spool-shaped base, a passageway extending through said throat section, said mounting end and said sealing end, said base having no threaded connection with respect to the clamp plate, an O-ring positioned between said base and the clamp plate, and said base forming fluidic communication between a coolant inlet and said passageway of said base.

15. In the molding tool according to claim 14, wherein said base has first threads engageable with second threads of said tube.

16. In the molding tool according to claim 14, wherein said passageway forms fluidic communication with said coolant inlet and a void formed between an external surface of said tube and a core pin mounted with respect to a retainer plate.

17. In the molding tool according to claim 14, wherein said base has extraction threads engageable with threads of a removal tool.

* * * * *